United States Patent
Thuneby et al.

(10) Patent No.: US 8,768,793 B2
(45) Date of Patent: Jul. 1, 2014

(54) METHOD OF REPOSTING TRANSACTIONAL DOCUMENTS

(75) Inventors: John Kenneth Goldermann Thuneby, Seattle, WA (US); Hans Jørgen Grøn, Redmond, WA (US); Robert F. Blanch, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 2547 days.

(21) Appl. No.: 10/804,947

(22) Filed: Mar. 18, 2004

(65) Prior Publication Data

US 2005/0131782 A1  Jun. 16, 2005

Related U.S. Application Data

(60) Provisional application No. 60/533,668, filed on Dec. 31, 2003.

(51) Int. Cl.
*G06Q 40/00* (2012.01)
(52) U.S. Cl.
USPC .......................................................... 705/30
(58) Field of Classification Search
USPC ..................................................... 705/30–40
See application file for complete search history.

(56) References Cited

U.S. PATENT DOCUMENTS

| | | | | |
|---|---|---|---|---|
| 5,117,356 | A | | 5/1992 | Marks .............................. 705/30 |
| 5,875,435 | A | | 2/1999 | Brown ............................. 705/30 |
| 6,067,551 | A | * | 5/2000 | Brown et al. ................. 707/203 |
| 6,584,453 | B1 | * | 6/2003 | Rahman et al. ................. 705/39 |
| 6,807,533 | B1 | * | 10/2004 | Land et al. ....................... 705/30 |
| 2001/0029475 | A1 | | 10/2001 | Boicourt et al. ................ 705/30 |
| 2002/0111891 | A1 | | 8/2002 | Hoffman et al. ................ 705/36 |
| 2005/0125251 | A1 | | 6/2005 | Berger et al. ..................... 705/1 |
| 2007/0011014 | A1 | | 1/2007 | Umapathy ........................ 705/1 |
| 2007/0179872 | A1 | | 8/2007 | Macalka et al. ................ 705/35 |

OTHER PUBLICATIONS

"Establishing Accounting Principles as Invariants of Financial Systems," Naftaly H. Minsky, Integrity Internal Control and Security in Information Systems, pp. 41-56, Connecting Governance and Technology 2002 No. 83.
"Annals of Operations Research," Robert A. Nehmer and Derek Robinson, "An algebraic model for the representation of accounting systems," pp. 179-198, Baltzer Science Publishers, vol. 71, 1997.
"Accounting Software Update," Financial Navigator, Accounting Technology, Publication New York, NY: Faulkner & Gray, Feb./Mar. 1996, pp. 10-13.
Accounting Software Update, "In the Black: Real Accounting, Real Easy—Really?," "Accounting Technology," Publication New York, NY: Faulkner & Gray, Jul. 1994, pp. 9-10, 12.

(Continued)

*Primary Examiner* — Thomas M Hammond, III
(74) *Attorney, Agent, or Firm* — Damon Rieth; Jim Ross; Micky Minhas

(57) ABSTRACT

A method of modifying an original transaction document of a computerized accounting system that includes a general ledger having original transaction postings corresponding to transactions contained in the original transaction document, a new transaction document is generated in response to a command to edit the original transaction document. Next, the new transaction document is modified and saved as a modified new transaction document. The original transaction postings in the general ledger are then nullified. Finally, transactions of the modified new transaction document are posted in the general ledger.

15 Claims, 10 Drawing Sheets

(56) References Cited

OTHER PUBLICATIONS

"Newviews, The Visual Approach to Accounting," Financial Control Management, Micro Decision, Business Solutions for PC Buyers, Jun. 1991, Cover and p. 129.

Management Accounting for Corporate Financial Decision, "Everything You Always Wanted to Know About Checks, Reporting Corporate Cash Flows," Jul. 1990, Cover and pp. 2, 4, and 16, Jul. 1990.

Business Software for Managers Who Use PCs, "Skating into Double-Entry Accounting," pp. 3, 50, 52, 54, 55, 56, and 57, vol. 6, No. 2, Feb. 1988.

Accountancy, The Journal of the Institute of Chartered Accountants in England and Wales, The Business of Sport, Project Overkill, "Double Entry Still Exists—After a Fashion," Cover, pp. 1, 132 and 133, Apr. 1987.

AgriComp, The Reference for Farm Computing, "Why Double Entry Accounting? . . . The step beyond single entry," Cover and pp. 4 and 46-48.

\* cited by examiner

METHOD OF REPOSTING TRANSACTIONAL DOCUMENTS

The present application claims the benefit of U.S. Provisional Patent Application Ser. No. 60/533,668, filed Dec. 31, 2003.

BACKGROUND OF THE INVENTION

The present invention generally relates to computerized accounting systems and programs that allow non-accountant users to edit and delete accounting transactions while maintaining a general ledger in accordance with strict accounting rules that are preferred by auditors and accountants.

Computerized accounting systems (i.e., software applications) are available that are configured for use by both accountants and non-accountants. These systems allow users to set up various types of accounts such as expense accounts, customer accounts, vendor accounts, and perform various tasks within each. Additionally, such systems allow users to generate customized transaction documents that reflect paper documents that are used to create financial transactions. Such transaction documents include invoices, vendor bills, checks, deposits, journal entries and other documents that record or represent financial transactions for the business.

Computerized accounting systems generally perform basic accounting tasks for the non-accountant user including the maintenance of a general ledger. The general ledger maintains a list of posted transactions relating to an account that are recorded in transaction documents (i.e., an invoice). Such transactions generally include credits and debits. For example, user can generate an invoice for a transaction in which ten items are sold to a customer. The invoice lists various information about the sale, such as customer information, the date of sale, the quantity of items sold, the cost for each item, and the total cost of the sale. When the user saves the invoice, the transactions recorded therein are posted to the general ledger of the system.

If a change is desired to any of the transactions contained in the original transaction document that was posted to the general ledger, such systems allow the user repost or modify the original transaction document. In general, the user opens the original transaction document and directly edits the transactions contained therein. The edited original transaction document replaces the original transaction document when it is saved, and the computerized accounting system only posts the transaction changes to the general ledger that were made as a result of the edits.

Accordingly, no posting is made to the general ledger for transactions that remain unchanged in the edited original transaction document. However, where a partial credit, a debit, or other modification is applied to one of the original transactions, only the change in the original transaction is posted to the general ledger. For example, when the original transaction document is edited to apply a $20 credit to an original transaction consisting of a debit of $100, only the $20 credit is posted in the general ledger.

Unfortunately, such general ledger posting practices fail to meet strict accounting rules that are preferred by auditors and accountants. One such rule requires that original transaction documents that are posted to the general ledger never be deleted or edited. Accordingly, once an original transaction document is generated it should not be directly edited as is allowed by prior art computerized accounting systems.

Therefore, a need exists for a method of reposting or modifying an original transaction document in a computerized accounting system or application that satisfies the preferred rule of accountants and auditors.

SUMMARY OF THE INVENTION

The present invention is generally directed to a method of reposting or modifying an original transaction document of a computerized accounting system or application that includes a general ledger having original transaction postings corresponding to transactions contained in the original transaction document. In the method, a new transaction document is generated in response to a command to open the original transaction document. The new transaction document is a copy of the original transaction document. Next, the new transaction document is modified and saved as a modified new transaction document. The original transaction postings in the general ledger are then nullified. Finally, the transactions of the modified new transaction document are posted in the general ledger.

In accordance with another embodiment of the invention, a user modifies the original transaction document by first opening the saved original transaction document. Next, the user is allowed to modify the opened original transaction document and save the modified original transaction document as a new transaction document. The original transaction postings are then nullified in the general ledger. Finally, the transactions of the new transaction document are posted in the general ledger.

DETAILED DESCRIPTION OF ILLUSTRATIVE EMBODIMENTS

The present invention generally relates to a computerized accounting system or application that is designed for use by non-account users to simplify the recording of financial transactions. Prior to describing the present invention in greater detail, an exemplary computing environment in which the present invention can exist will be described.

Computing Environment Overview

Figure 1:
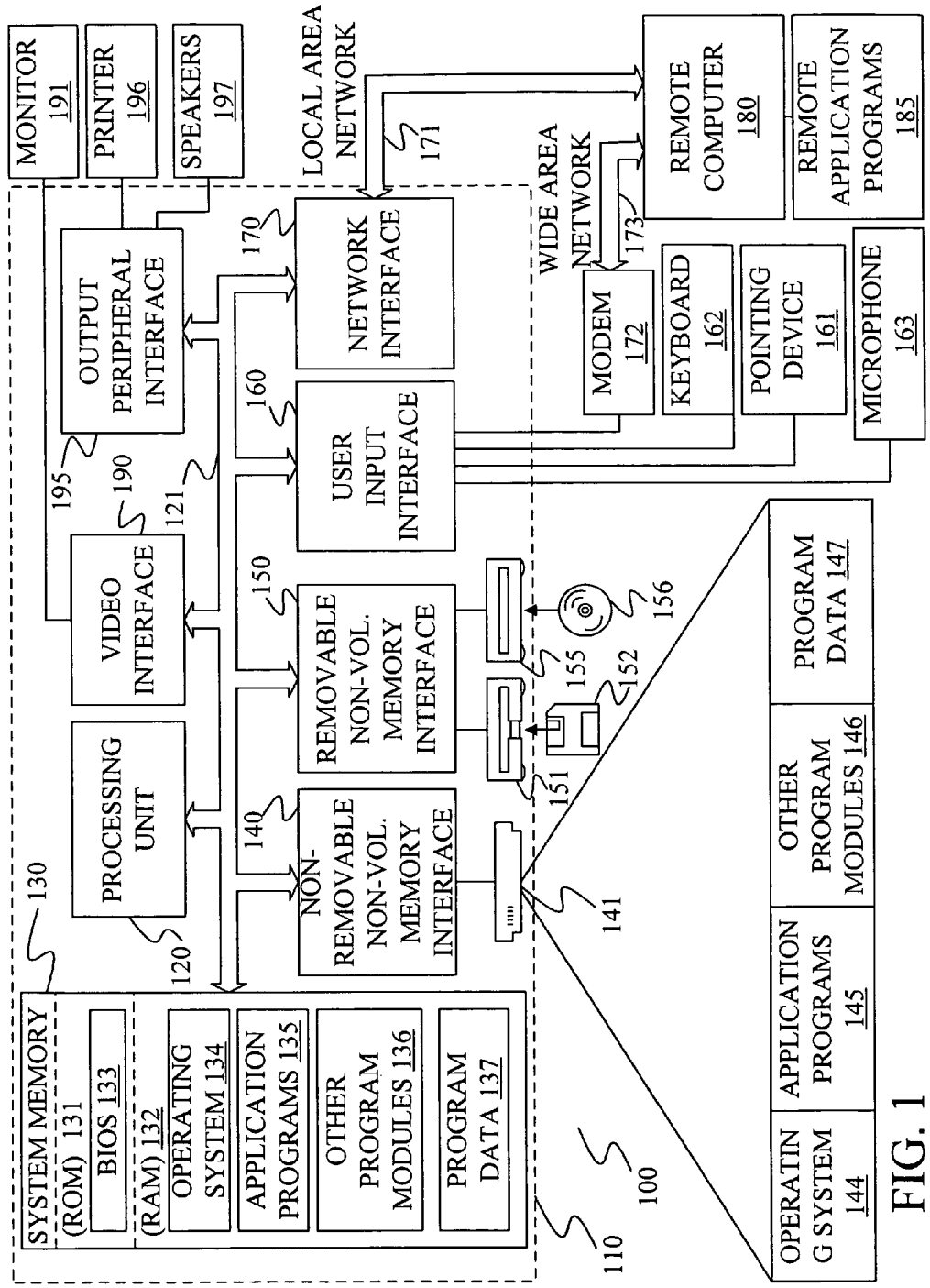
FIG. 1 is a block diagram illustrating an environment in which the present invention may be used.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

As noted above, the present invention can be carried out on a computer system such as that described with respect to FIG. 1. Alternatively, the present invention can be carried out on a server, a computer devoted to message handling, or on a distributed system in which different portions of the present invention are carried out on different parts of the distributed computing system.

High Level Software Environment Overview

Figure 2:
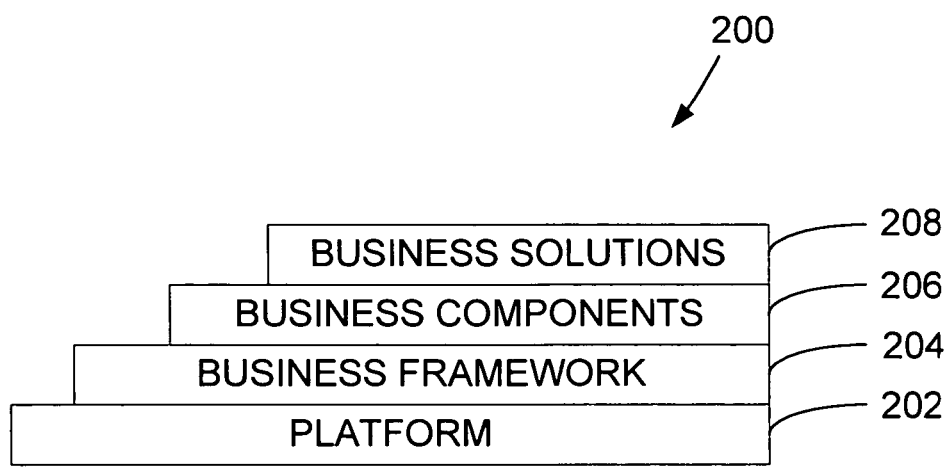
FIG. 2 is a block diagram illustrating a software environment in which the present invention can be used.

FIG. 2 is a block diagram of a higher level environment in which the present invention may reside. Environment 200 shows a tools and server platform 202, a business framework 204, business components 206, in which the present invention resides, and a business solution 208. Tools and server platform 202 illustratively provide a platform for services which allow applications to communicate and share data over a wide area network. The platform 202 can, for example, include tools and server systems to enable this functionality. Business components 206 illustratively include the functionality for business applications which are packaged together based on a developer's interaction with business framework 204. Business components 206 can, for example, include a computerized accounting system or application in accordance with embodiments of the present invention that includes executable instructions for carrying out the methods described herein as well as the formation and maintenance of a general ledger, transactional documents and, other financial application modules. Additionally, business components 206 can include sales force automation services and customer relation management applications. By writing business components 206 using framework 204, these components are extensible and can be utilized to serve the needs of multiple users, depending on the level of functionality and complexity that is desired.

Each business solution 208 includes one or more applications. The applications are groups of business components presented through a user interface and individually deployed.

Business framework 204 is used by developers of business components 206. Business framework 204 enables business applications in a productive, reliable and consistent fashion.

Overview of Computerized Accounting Systems or Applications

As explained above, computerized accounting systems or applications are generally configured to perform basic accounting tasks for both the accountant and the non-accountant user, including the maintenance of a general ledger. The general ledger maintains a list of posted transactions relating to an account that are recorded in transaction documents, such as an invoice, a vendor bill, a check, a deposit, a journal entry, or other transaction documents that record or represent financial transactions for the business. Upon saving of the transaction document, the computerized accounting system or application posts the transactions contained in the transaction document to a general ledger for the account. The posting of the transactions is generally implemented by posting logic in accordance with rules that are contained in a table or in accordance with a model. Accordingly, the general ledger records the history of the financial transactions of an account.

There are many strict accounting rules that are preferred by auditors and accountants that enable them to perform their jobs more efficiently while reducing the likelihood of errors. One such rule requires that original transaction documents (i.e., an invoice) and the transactions that are contained therein which are posted to the general ledger, never be deleted or edited. Accordingly, once an original document is generated, the transactions contained therein should not be modified. Likewise, the postings in the general ledger of the transactions of the original transaction document should not be modified.

Prior Art Computerized Accounting Systems or Applications

Computerized accounting systems or applications of the prior art are configured to be very user friendly and are geared toward users having little understanding of accounting. Unfortunately, prior art computerized accounting systems fail to adhere to the strict rules preferred by auditors and accountants.

Figure 3:
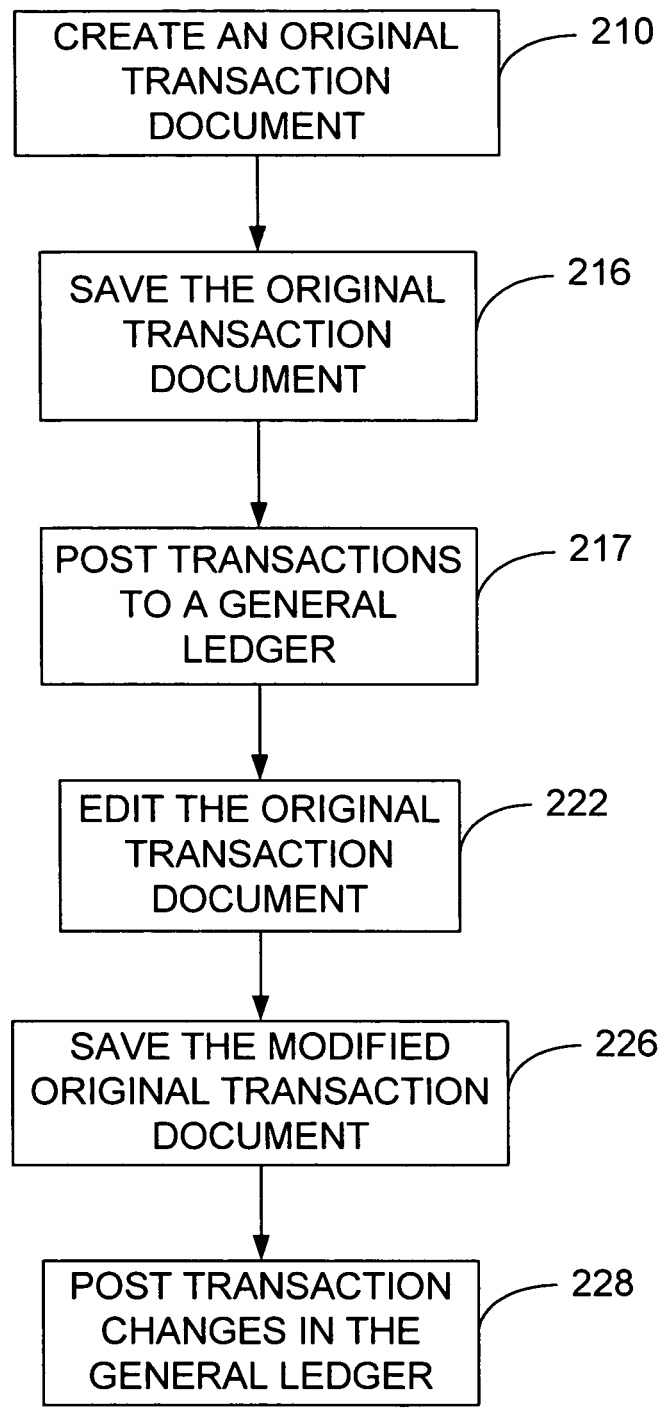
FIG. 3 is a flowchart illustrating a method of reposting or modifying an original transaction document in accordance with methods of the prior art.
Figure 4:
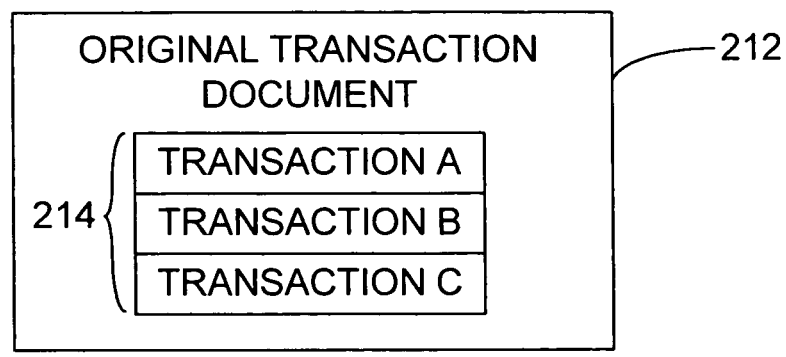
FIG. 4 is a block diagram of an example of an original transaction document.
Figure 5:
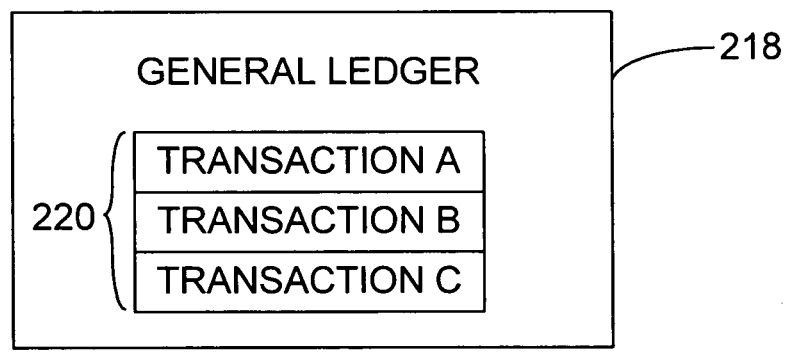
FIG. 5 is a block diagram of an example of a general ledger in which transactions of the original transaction document of FIG. 4 are posted.

FIG. 3 is a flowchart illustrating the method of prior art computerized accounting systems for reposting or modifying an original transaction document, such as an invoice. At step 210, an original transaction document is created. One example of such a document, is the original transaction document 212 depicted in the block diagram of FIG. 4. Original transaction document 212 can include various types of information (not shown) such as, for example, customer information, date information, contact information, and other types of information. Additionally, original transaction document 212 includes one or more transactions 214, such as transactions A-C. Transactions 214 can be product sales, credits to an account, debits to an account, or other financial transactions. Once original transaction document 212 is created, it is saved at step 216. As indicated at step 217, the saving of original transaction document 212 results in the posting of transactions 214 to a general ledger 218, an example of which is depicted in FIG. 5. Accordingly, general ledger 218 includes a posting 220 for each of transactions 214 that were contained in original transaction document 212.

Figure 6:
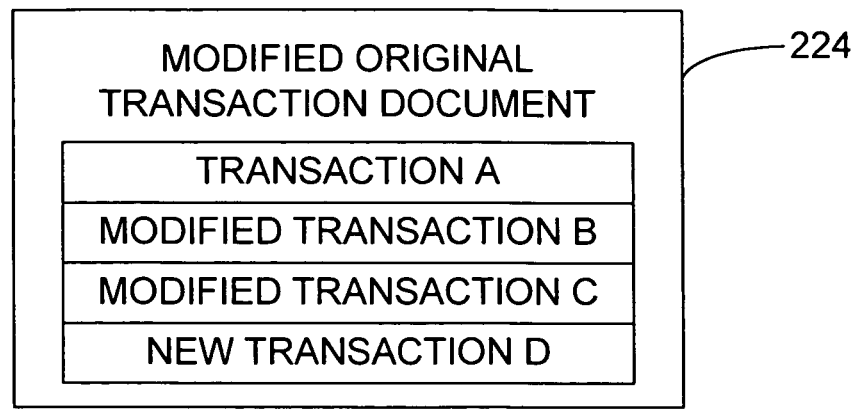
FIG. 6 is a block diagram of an example of a modified original transaction document.

One goal of computerized accounting systems or applications is to make them as user-friendly as possible such that non-accountant users can perform basic accounting tasks. To that end, prior art accounting systems allow users to open and edit the transactions 214 of the original transaction document 212, as indicated at step 222, rather than forcing the user to perform the operation in accordance with the procedures preferred by auditors and accountants. For example, a user may edit the original transaction document 212 shown in FIG. 4 by directly modifying transactions B and C and adding transaction D to the opened original transaction document, while leaving transaction A unchanged, as illustrated in the modified original transaction document 224 of FIG. 6. The changes to transactions B and C can include the application of a credit, the modification of the sales price, or other change.

When the modified original transaction document 224 is saved at step 226, it completely replaces the original transaction document 212 in memory. Accordingly, this method violates the rule preferred by auditors and accountants because it allows for the direct editing and replacement of the original transaction document.

Figure 7:
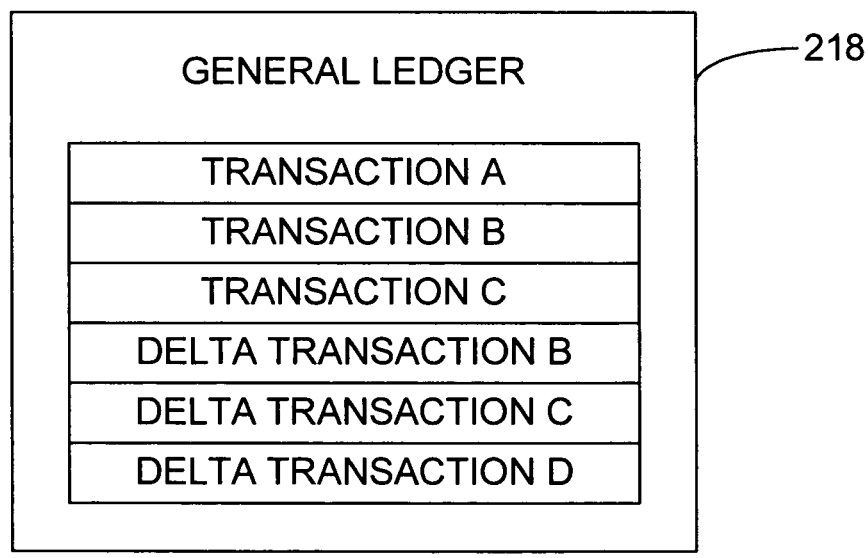
FIG. 7 is a block diagram of an example of a general ledger that includes postings of an original transaction document and delta transaction postings resulting from a reposting of the original transaction document.

Finally, at step 228, only the changes to the transactions caused by the modifications to original transaction document 212 are posted to the general ledger 218, as illustrated in FIG. 7. Accordingly, the general ledger 218 (FIG. 7) includes the original transaction postings 220 (transactions A-C), a delta transaction B, a delta transaction C, and a delta transaction D. Delta transactions B and C respectively represent the difference between the modified transactions B and C of the modified original transaction document 224 and the original transactions B and C of the original transaction document 212. For example, when the original transaction B represents a financial transaction consisting of a debit of $100, which was modified to include a $20 credit in the modified transaction B of the modified transaction document 224, the posted delta transaction B in general ledger 218 would be only the $20 credit, which is the change between original transaction B and the modified transaction B. Delta transaction D is the same as new transaction D since there is no corresponding original transaction that was modified in original transaction document 212.

Computerized Accounting System for Application of the Present Invention

The present invention is generally directed to a method of reposting or modifying an original transaction document of a computerized accounting system or application without changing and replacing the saved original transaction document. As a result, the method of the present invention satisfies the rule preferred by auditors and accountants.

It should be understood that the method of the present invention can be used to maintain general ledgers in accordance with conventional single and double entry bookkeeping practices. Single entry bookkeeping generally posts each transaction in a single account ledger, while double entry bookkeeping posts each transaction in two account ledgers (e.g., a debit account and a credit account).

Figure 8:
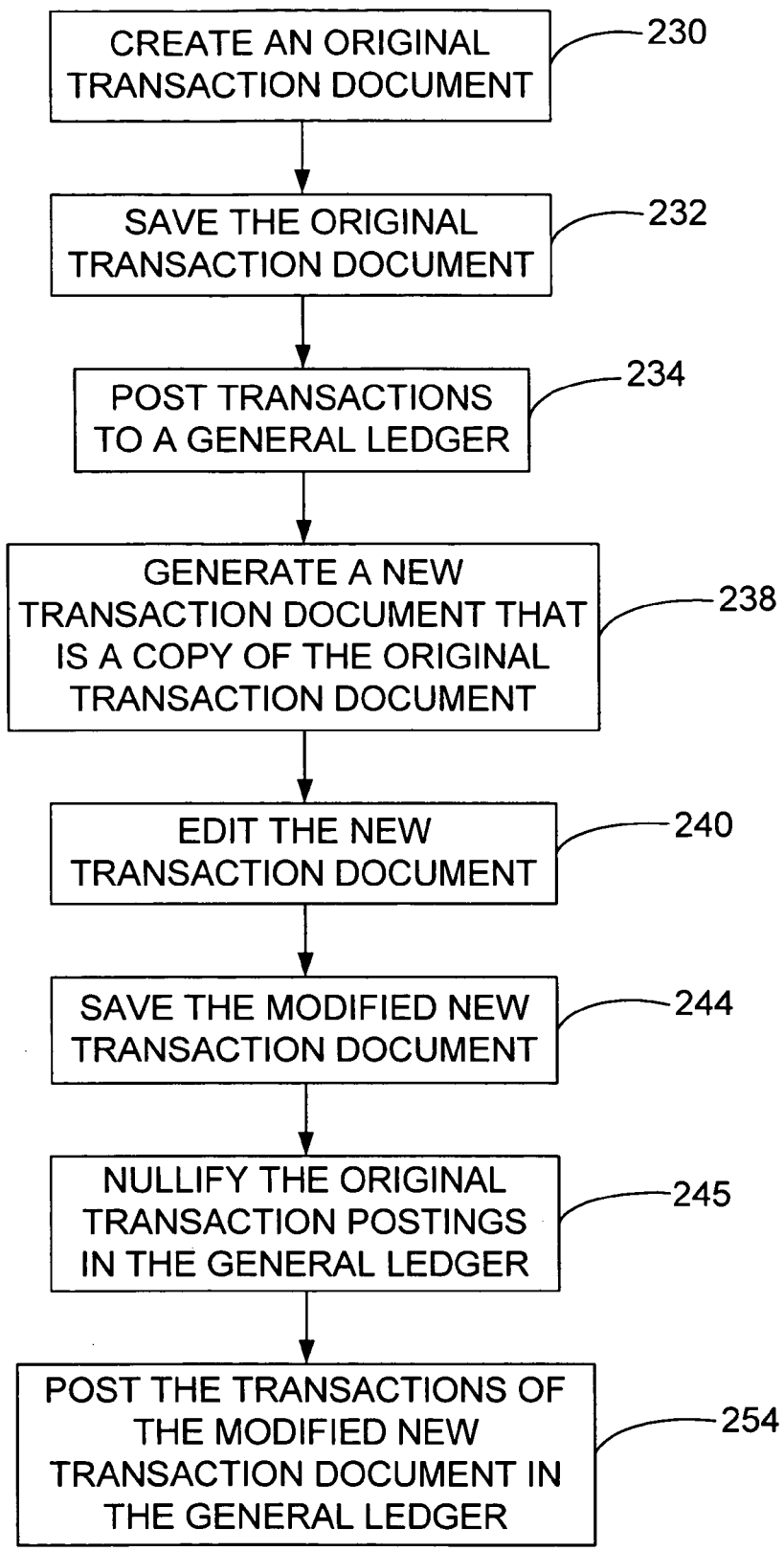
FIG. 8 is a flowchart illustrating a method of reposting or modifying an original transaction document in accordance with an embodiment of the invention.

FIG. 8 is a flowchart of a method of reposting or modifying an original transaction document in accordance with embodiments of the present invention, which can be implemented by the system 100 (FIG. 1) described above through the execution of corresponding program instructions. The method begins, at step 230, by creating an original transaction document, such as original transaction document 212 shown in FIG. 4. The original transaction document is then saved at step 232. Additionally, the transactions 214 of the original transaction document 212 are posted to a general ledger in response to the saving of the original transaction document 212 in memory, as indicated by step 234 of FIG. 8 and illustrated in the general ledger 218 of FIG. 5. Accordingly, the original transaction document 212 includes illustrative transaction examples listed as transactions A-C, and the general ledger 218 includes the corresponding original transaction postings 220.

Figure 9:
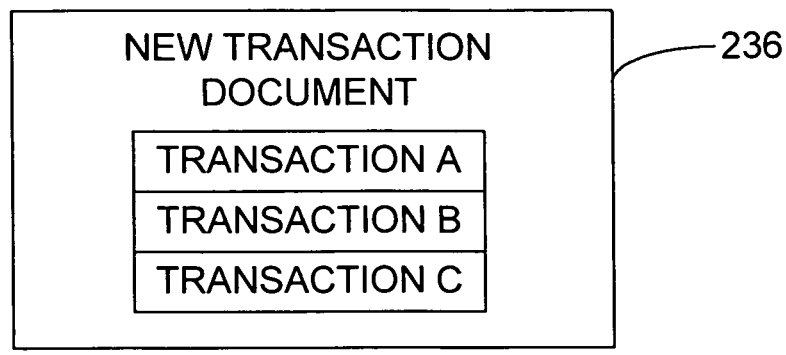
FIG. 9 is a block diagram of an example of a new transaction document in accordance with the embodiment of the invention.

The method of the present invention allows a user to select the saved original transaction document when the user wishes to edit the transactions contained therein which have been posted to the general ledger. In response to a command to edit the original transaction document 212, a new transaction document 236, shown in FIG. 9, is generated as indicated at step 238 of the method. New transaction document 236 is a copy of the original transaction document 212. It should be understood that the user is unaware of the formation of the new transaction document 236, which occurs automatically in the background of the application in response to the command to edit the original transaction document.

Figure 10:
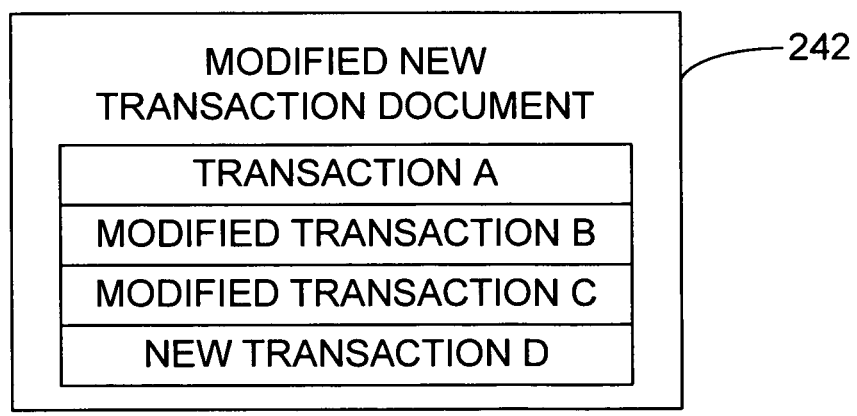
FIG. 10 is a block diagram of an example of a modified new transaction document in accordance with an embodiment of the invention.

Next, at step 240, the user can modify the new transaction document 236 to make changes to the copied original transactions contained therein. In accordance with one embodiment of the invention the modifying step 240 includes adding, deleting, or changing a transaction in the new transaction document 236. For instance, the modifying step 240 can include applying a credit, applying a debit, modifying a quantity, or modifying a cost of a transaction in the new transaction document 236. An example of a modified new transaction document 242 is provided in FIG. 10, in which transaction A is unchanged, transactions B and C have been modified, and transaction D has been added. The modifications to the new transaction document 236 can be similar to those described above with respect to FIG. 6.

At step 244, the modified new transaction document 242 is saved as a separate document from the original transaction document 212. Accordingly, the original transaction document 212 remains unedited and saved in memory, such as memory 140 (FIG. 1) while the modified new transaction document 242 is also retained in memory.

At step 245 of the method, the original transaction postings 220 in the general ledger 218 (FIG. 5) are nullified in response to the saving of the modified new transaction document 242. In accordance with one embodiment of the invention, the original transaction postings are nullified by posting one or more canceling transactions in the general ledger, each of which operate to nullify one of the original transaction postings in the general ledger. An example of this embodiment of the method is illustrated in the general ledger 246 depicted in FIG. 11. General ledger 246 includes original transaction postings 248 (transactions A-C) that correspond to the original transaction document 212. Additionally, general ledger 246 includes canceling transactions 250, which are the antitheses of original transaction postings 248. For example, where the original transaction A corresponds to a credit of a certain amount, canceling transaction A corresponds to a debit of the same amount. As a result, each of the canceling transactions 250 operate to negate or nullify the original transaction postings 248 without modifying or deleting them.

Figure 12:
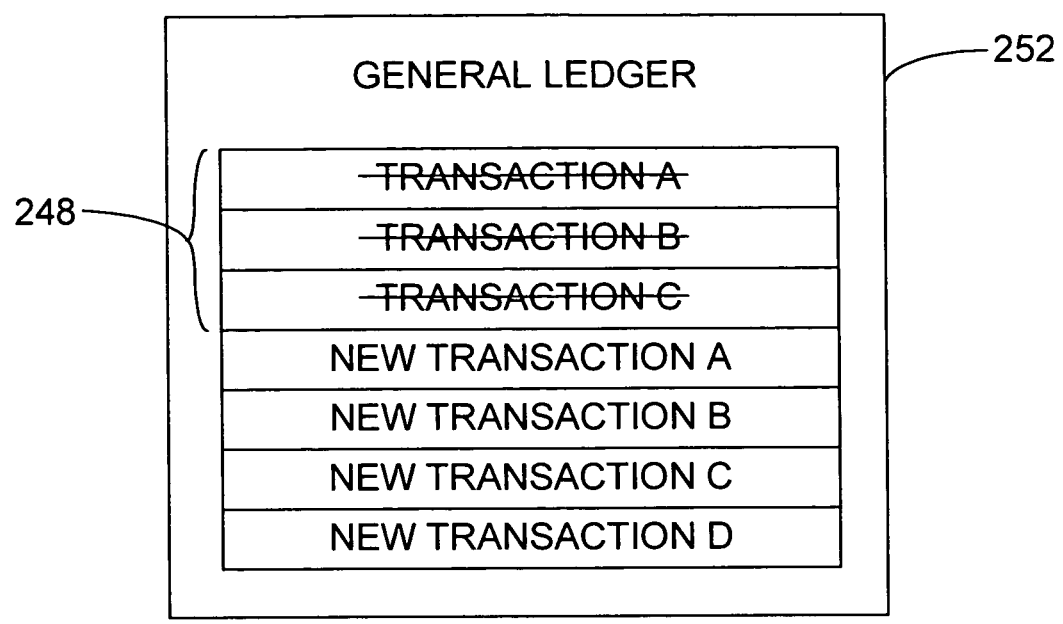

In accordance with another embodiment of the invention, the original transaction postings 248 are nullified in step 245 of the method by voiding them in the general ledger, as illustrated in the example general ledger 252 shown in the block diagram of FIG. 12. The voiding of the original transaction postings is represented by a line striking through each of the original transaction postings 248. In general, the voiding of the original transaction postings 248 renders them invalid and causes them to have no affect on the balance of the general ledger 252. Additionally, the original transaction document 212 is preferably voided along with the original transaction postings 248 in the general ledger 252. While the voided original transaction document 212 can still be viewed by the user, the accounting system of the present invention preferably prohibits the reposting of the voided original transaction document 212 by the user.

Figure 11:
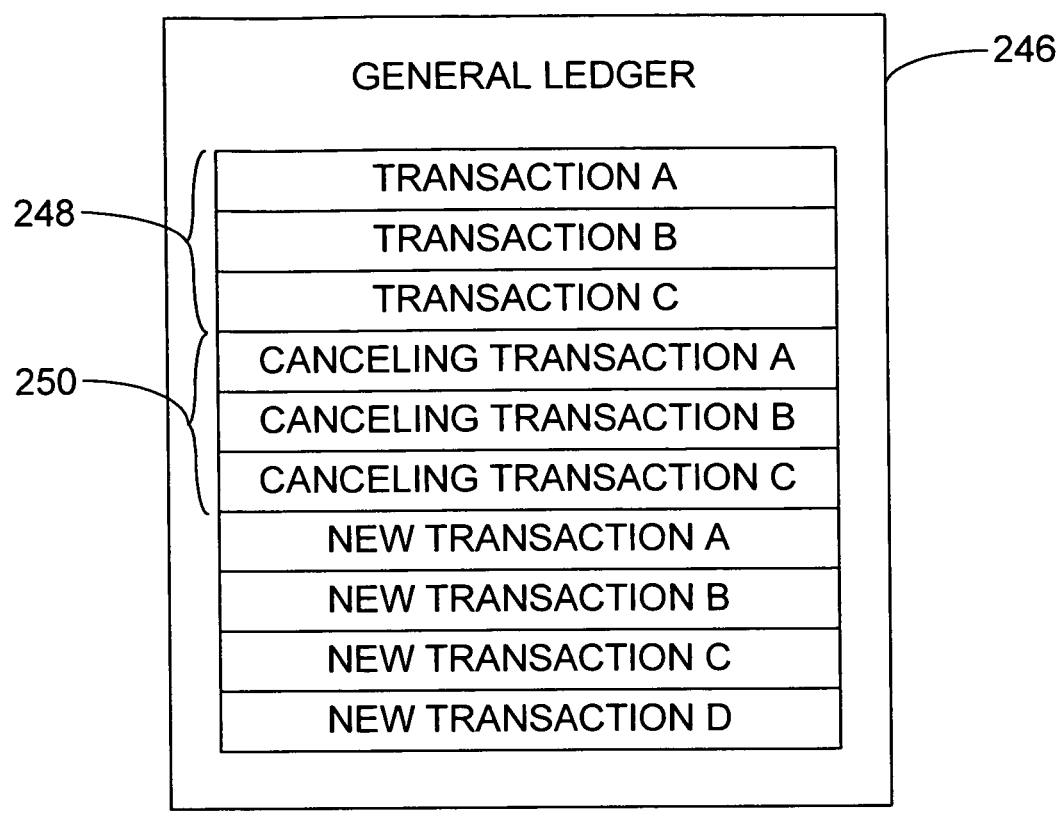
FIGS. 11 and 12 are block diagrams of examples of general ledgers in which original transaction postings have been nullified in accordance with embodiments of the invention.

Finally, at step 254, each of the transactions of the modified new transaction document 242 are posted in the general ledger 246 or 252, as illustrated by new transaction postings A-D in FIGS. 11 and 12. As a result, the general ledger 246 or 252 reflects the current state of the account as a result of the modifications to the original transaction document 212 made by the user. Additionally, the method avoids directly editing and overwriting the original transaction document and the corresponding transactions thereby satisfying the rule preferred by auditors and accountants.

Figure 13:
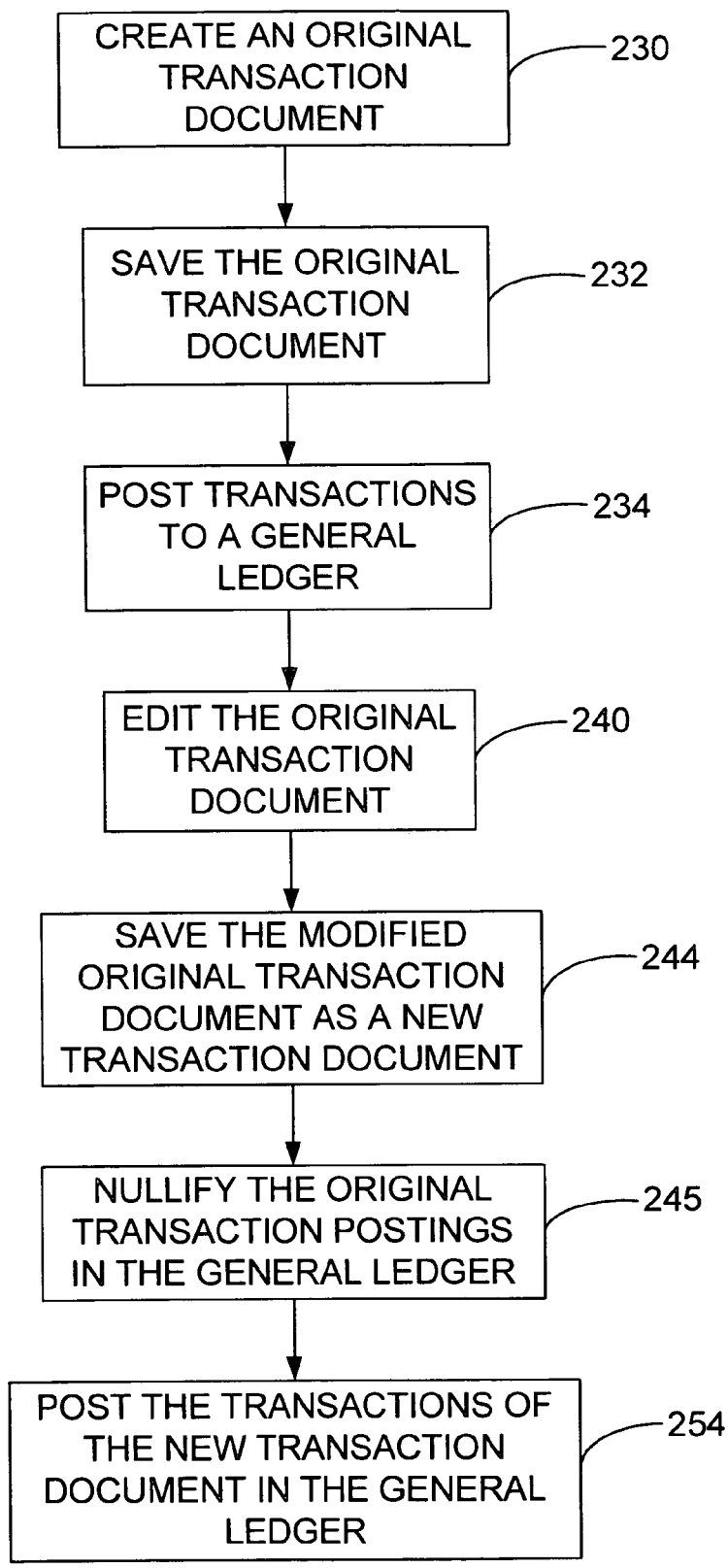
FIG. 13 is a flowchart illustrating a method of reposting or modifying an original transaction document in accordance with an embodiment of the invention.

FIG. 13 is a flowchart illustrating a method of reposting or modifying an original transaction document in accordance with another embodiment of the invention. In the method, an original transaction document (such as original transaction document 212 shown in FIG. 4) is created at step 260, saved at step 262, and the transactions contained in the original transaction document are posted in the general ledger 218 (FIG. 5) at step 264. These steps are generally performed as described above with respect to steps 230, 232 and 234 of the method illustrated in the flowchart of FIG. 8. When a user wishes to edit the original transaction document 212, the user, at step 266, opens the original transaction document 212 and modifies it as desired to create a modified original transaction document 224, as discussed above with respect to FIG. 6. However, unlike the prior art method, when the user attempts to save the modified original transaction document 224, at step 268, the original transaction document 212 remains saved in memory (such as memory 140 of FIG. 1) and the modified original transaction document 224 is saved as a new transaction document, such as modified new transaction document 242 shown in FIG. 10. This is performed by the accounting system or application unbeknownst to the user.

Next, at step 270, the original transaction postings 248 (transactions A-C) in the general ledger 246 or 252 (FIGS. 11 and 12) are nullified in accordance with the methods described above with respect to step 245 of the method of FIG. 8. Finally, at step 272, the transactions in the new transaction document 242 are posted in the general ledger 246 or 252 as new transactions A-D, as shown in FIGS. 11 and 12, in the manner discussed above with respect to step 254 of FIG. 8.

Although the present invention has been described with reference to particular embodiments, workers skilled in the art will recognize that changes may be made in form and detail without departing from the spirit and scope of the invention. For example, the particular order of the steps of the methods of the present invention can be modified from that described above or depicted in the corresponding figures without departing from the spirit and scope of the present invention.

What is claimed is:

1. A method of modifying a document comprising:
providing a tangible computer storage medium;
providing an original transaction document stored on the computer storage medium selected from the group consisting of an invoice and a vendor bill;
providing a general ledger stored on the computer storage medium, the general ledger including original transaction postings corresponding to transactions contained in the original transaction document;
providing a processor configured to access the computer storage medium;
generating a new transaction document using the processor that is a copy of the original transaction document in response to a command to edit the original transaction document, wherein the new transaction document includes all of the transactions contained in the original transaction document, and the transactions of the original transaction document are selected from the group consisting of a product sale, a credit to an account and a debit to an account;
modifying at least one of the transactions in the new transaction document using the processor;
saving the modified new transaction document on the computer storage medium;
nullifying the original transaction postings in the general ledger using the processor comprising posting one or more canceling transactions in the general ledger, each of which operate to nullify one of the original transaction postings in the general ledger; and
posting transactions of the saved modified new transaction document in the general ledger using the processor.

2. The method of claim 1, wherein modifying at least one of the transactions in the new transaction document includes adding, deleting, or changing a transaction in the new transaction document.

3. The method of claim 2, wherein modifying at least one of the transactions in the new transaction document includes applying a credit, applying a debit, modifying a quantity, or modifying a cost of the new transaction document.

4. The method of claim 1, wherein posting transactions of the modified new transaction document in the general ledger is performed in response to saving the modified new transaction document on the computer storage medium.

5. A method of modifying a document comprising:
providing a tangible computer storage medium;
providing an original transaction document stored on the computer storage medium, wherein the original transaction document is an invoice;
providing a general ledger stored on the computer storage medium, the general ledger including original transaction postings corresponding to transactions contained in the original transaction document;
providing a processor configured to access the computer storage medium;
opening the stored original transaction document using the processor, the original transactions of which are each selected from the group consisting of a product sale, a credit to an account and a debit to an account;
modifying at least one of the original transactions in the original transaction document using the processor;
saving the modified original transaction document as a new transaction document on the computer storage medium using the processor, wherein the new transaction document includes the non-modified original transactions and the at least one modified original transaction;

nullifying the original transaction postings in the general ledger using the processor; and posting the non-modified original transactions and the at least one modified transaction of the new transaction document in the general ledger using the processor in response to saving the modified original transaction document.

6. The method of claim 5, wherein modifying at least one of the original transactions in the original transaction document includes adding, deleting, or changing a transaction in the original transaction document.

7. The method of claim 5, wherein modifying at least one of the original transactions in the original transaction document includes applying a credit, applying a debit, modifying a quantity, or modifying a cost of the new transaction document.

8. The method of claim 5, wherein nullifying the original transaction postings in the general ledger includes posting one or more canceling transactions in the general ledger that nullify each of the original transaction postings in the general ledger.

9. The method of claim 5, wherein nullifying the original transaction postings in the general ledger includes voiding the original transaction postings in the general ledger.

10. The method of claim 5, including voiding the original transaction document using the processor.

11. A method of modifying a document comprising;

providing a tangible computer storage medium;

providing an original transaction document stored on the computer storage medium selected from the group consisting of an invoice and a vendor bill;

providing a general ledger stored on the computer storage medium, the general ledger including original transaction postings corresponding to transactions contained in the original transaction document;

providing a processor configured to access the computer storage medium;

generating a new transaction document that is a copy of the original transaction document in response to a command to edit the original transaction document using the processor, wherein the new transaction document includes the transactions contained in the original transaction document that are selected from the group consisting of a product sale, a credit to an account and a debit to an account;

modifying at least one of the transactions in the new transaction document using the processor;

saving the modified new transaction document on the computer storage medium using the processor;

nullifying the original transaction postings in the general ledger using the processor comprising voiding the original transaction postings in the general ledger; and posting transactions of the saved modified new transaction document in the general ledger using the processor.

12. The method of claim 11, wherein modifying at least one of the transactions in the new transaction document includes adding, deleting, or changing a transaction in the new transaction document.

13. The method of claim 12, wherein modifying at least one of the transactions in the new transaction document includes applying a credit, applying a debit, modifying a quantity, or modifying a cost of the new transaction document.

14. The method of claim 11, nullifying the original transaction postings in the general ledger is performed in response to saving the modified new transaction document on the computer storage medium.

15. The method of claim 11 including voiding the original transaction document using the processor.

* * * * *